(12) United States Patent
Okino et al.

(10) Patent No.: US 7,319,568 B2
(45) Date of Patent: Jan. 15, 2008

(54) MAGNETIC RECORDING MEDIA, MAGNETIC RECORDING APPARATUS, AND STAMPER

(75) Inventors: Takeshi Okino, Yokohama (JP); Akira Kikitsu, Yokohama (JP); Yoichiro Tanaka, Kawasaki (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 136 days.

(21) Appl. No.: 11/182,065

(22) Filed: Jul. 15, 2005

(65) Prior Publication Data

US 2006/0012905 A1 Jan. 19, 2006

(30) Foreign Application Priority Data

Jul. 16, 2004 (JP) ............................. 2004-210458

(51) Int. Cl.
  *G11B 5/09* (2006.01)
(52) U.S. Cl. .................... 360/48; 360/77.08; 360/15
(58) Field of Classification Search .................. None
  See application file for complete search history.

(56) References Cited

U.S. PATENT DOCUMENTS

| | | | |
|---|---|---|---|
| 3,286,251 A * | 11/1966 | Rendler et al. ................. 341/9 |
| 5,274,510 A | 12/1993 | Sugita et al. |
| 5,587,850 A * | 12/1996 | Ton-that ................... 360/77.08 |
| 5,600,506 A | 2/1997 | Baum et al. |
| 5,875,083 A * | 2/1999 | Oniki et al. ................. 360/135 |
| 6,424,479 B1 | 7/2002 | Hayashi |
| 6,433,950 B1 * | 8/2002 | Liikanen .................. 360/77.08 |
| 6,529,341 B1 * | 3/2003 | Ishida et al. .................. 360/48 |
| 6,667,849 B2 * | 12/2003 | Sasaki et al. ............... 360/126 |
| 6,805,966 B1 * | 10/2004 | Formato et al. ............ 428/457 |
| 6,961,203 B1 * | 11/2005 | Baker ..................... 360/77.08 |
| 7,035,036 B2 * | 4/2006 | Shimomura et al. .......... 360/75 |
| 7,147,790 B2 * | 12/2006 | Wachenschwanz et al. ... 216/22 |
| 7,150,844 B2 * | 12/2006 | Deeman et al. ............. 264/220 |
| 2003/0063403 A1 | 4/2003 | Nishikawa et al. |
| 2004/0101713 A1 | 5/2004 | Wachenschwanz et al. |

FOREIGN PATENT DOCUMENTS

JP  2000-339670 A  12/2000

(Continued)

OTHER PUBLICATIONS

Australian Search Report dated Jul. 27, 2006 for Singapore Appln. No. 200547883-1.

(Continued)

*Primary Examiner*—Hoa T. Nguyen
*Assistant Examiner*—Dismery Mercedes
(74) *Attorney, Agent, or Firm*—Pillsbury Winthrop Shaw Pittman, LLP

(57) ABSTRACT

A magnetic recording media has a magnetic layer formed on a substrate and includes data regions including a magnetic pattern constituting a recoding track and servo regions including magnetic patterns used as address bits, the data regions and the servo regions being contained in a plane of the magnetic layer. In a case where two magnetic patterns used as address bits on the servo regions corresponding to two adjacent recording tracks are arranged in such a manner that one corner of one of the magnetic patterns is closest to one corner of the other, the corners of the two magnetic patterns are substantially joined together.

10 Claims, 7 Drawing Sheets

FOREIGN PATENT DOCUMENTS

| | | |
|---|---|---|
| JP | 2001-143257 | 5/2001 |
| JP | 2001-312819 | 11/2001 |
| JP | 2003-141715 A | 5/2003 |
| JP | 2004-110896 A | 4/2004 |
| JP | 2004-265486 | 9/2004 |

OTHER PUBLICATIONS

Chinese Office Action dated May 25, 2007 for Appln. No. 200510084621.3.

* cited by examiner

MAGNETIC RECORDING MEDIA, MAGNETIC RECORDING APPARATUS, AND STAMPER

CROSS-REFERENCE TO RELATED APPLICATIONS

This application is based upon and claims the benefit of priority from prior Japanese Patent Application No. 2004-210458, filed Jul. 16, 2004, the entire contents of which are incorporated herein by reference.

BACKGROUND OF THE INVENTION

1. Field of the Invention

The present invention relates to a magnetic recording media having discrete tracks, a magnetic recording apparatus having the magnetic recording media, and a stamper used to manufacture the magnetic recording media.

2. Description of the Related Art

In recent years, much attention has been paid to discrete track media expected to improve the recording density; in the discrete track media, adjacent recording tracks are separated from one another by guard bands formed of grooves or a nonmagnetic material to suppress the magnetic interference between the adjacent tracks. To manufacture such discrete track media, the patterns of a magnetic layer are desirably formed by an imprint method using a stamper. In this case, if patterns of the magnetic layer corresponding to signals for the servo region as well as the patterns of recording tracks are formed by using the imprint method, it is possible to eliminate the need for a servo track write process, thus reducing costs.

There is a document that refers to position detection marks (an address section) in the servo zone Sz in a discrete track media (Jps. Pat. Appln. KOKAI Publication No. 2004-110896). However, the prior art does not consider adverse effects of fine configuration of the position detection marks (the address section) on signal quality.

The present inventors examined a discrete track media for the quality of address signals obtained from the servo regions. As a result, they have found that, in some cases, quality of the address signals is made insufficient with a high noise level. A probable cause is that when two magnetic patterns used as address bits on servo regions corresponding to two adjacent recording tracks are arranged so that one corner of one of the magnetic patterns is almost in point-contact with one corner of the other, magnetic fluxes are concentrated on the corners of the magnetic patterns. The concentration of the magnetic fluxes may increase the leakage magnetic field, which in turn may increase the noise.

BRIEF SUMMARY OF THE INVENTION

A magnetic recording media having a magnetic layer formed on a substrate according to one aspect of the present invention comprises: data regions including a magnetic pattern constituting a recoding track; and servo regions including magnetic patterns used as address bits, the data regions and the servo regions being contained in a plane of the magnetic layer, wherein, in a case where two magnetic patterns used as address bits on the servo regions corresponding to two adjacent recording tracks are arranged in such a manner that one corner of one of the magnetic patterns is closest to one corner of the other, the corners of the two magnetic patterns are substantially joined together.

A magnetic recording apparatus according to another aspect of the present invention comprises the above magnetic recording media.

A stamper used to manufacture the above magnetic recording media according to still another aspect of the present invention comprises patterns of projections and recesses corresponding to the magnetic patterns of the magnetic recording media.

DETAILED DESCRIPTION OF THE INVENTION

Figure 1:
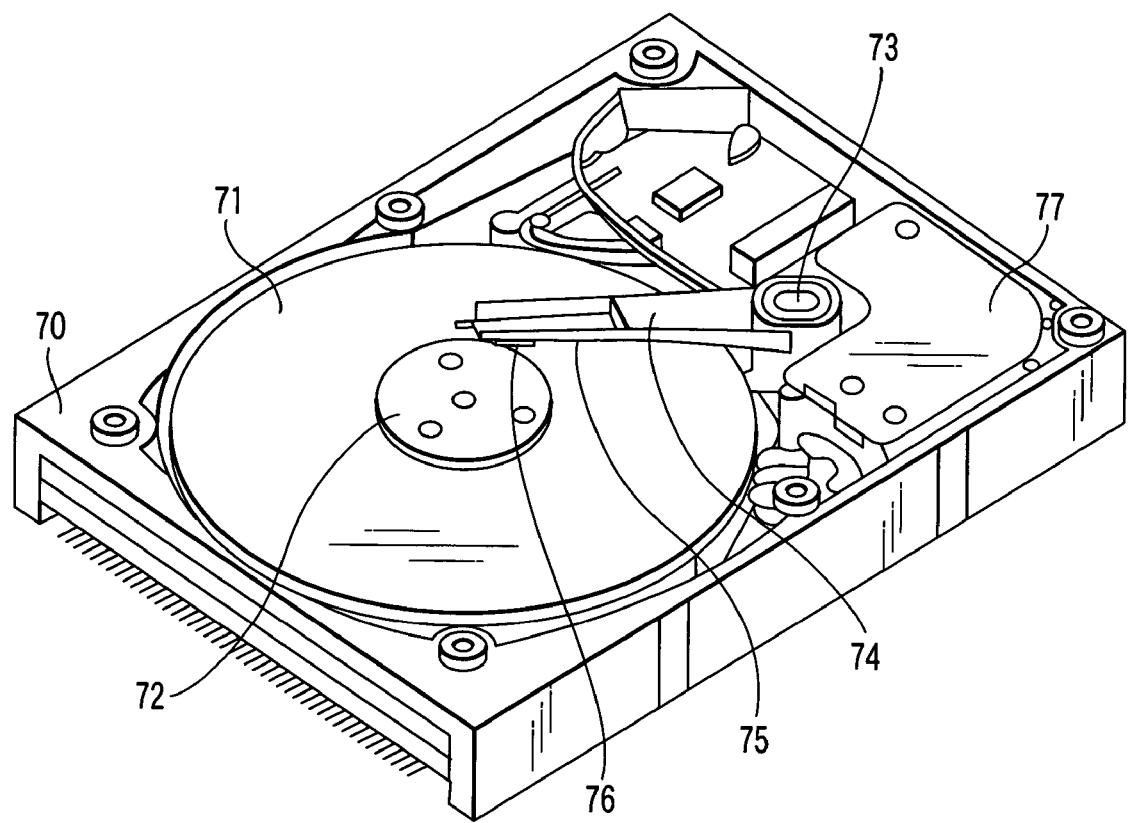
FIG. 1 is a perspective view showing a magnetic recording apparatus according to an embodiment of the present invention.

With reference to FIG. 1, a magnetic recording apparatus according to an embodiment of the present invention will be described. The magnetic recording apparatus comprises a magnetic disk 71, a head slider 76 including a magnetic head, a head suspension assembly (suspension 75 and actuator arm 74) that supports the head slider 76, a voice coil motor (VCM) 77, and a circuit board; all these components are provided inside a chassis 70.

The magnetic disk 71 is mounted on and rotated by a spindle motor 72. Various digital data are recorded on the magnetic disk 71 in a perpendicular magnetic recording system. The magnetic head incorporated in the head slider 76 is a so-called integrated head including a write head of a single pole structure and a read head using a shielded MR read element (GMR film, TMR film, or the like). The suspension 75 is held at one end of the actuator arm 74 to support the head slider 76 so as to face the recording surface of the magnetic disk 71. The actuator arm 74 is attached to a pivot 73. The voice coil motor (VCM) 77 is provided at the other end of the actuator arm 74. The voice coil motor (VCM) 77 drives the head suspension assembly to position the magnetic head at an arbitrary radial position of the magnetic disk 71. The circuit board comprises a head IC to generate driving signals for the voice coil motor (VCM) and control signals for controlling read and write operations performed by the magnetic head.

The magnetic disk used in the present invention is a so-called discrete track media. The discrete track media has a magnetic layer formed on a substrate, in which data regions each including a pattern of the magnetic layer constituting a recording track and servo regions each formed between data regions along the track direction and including magnetic patterns used as address bits are contained in the plane of the magnetic layer. These magnetic patterns are separated from one another by grooves or a nonmagnetic portion.

Figure 2:
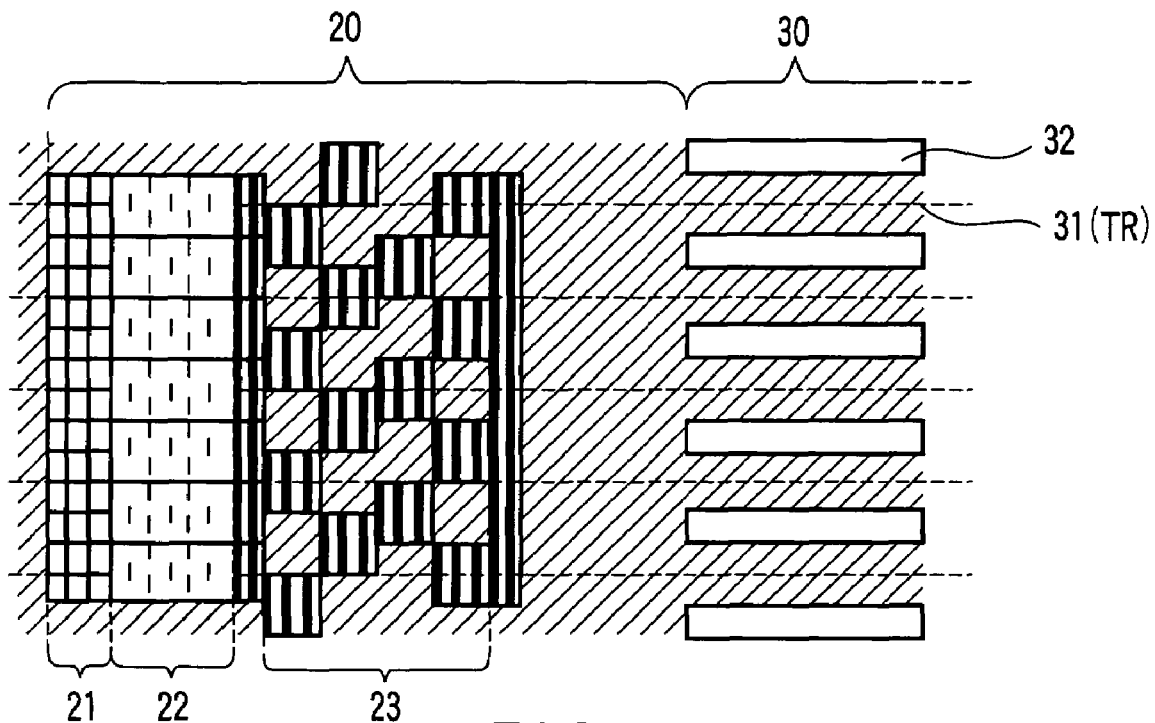
FIG. 2 is a plan view showing an example of magnetic patterns in a magnetic disk according to an embodiment of the present invention.

FIG. 2 shows an example of magnetic patterns formed on the surface of the magnetic disk 71. As shown in FIG. 2, servo regions 20 and data regions 30 are alternately formed along a circumferential direction. The servo region 20 includes a preamble section 21, an address section 22, and a burst section 23; each of these regions is formed of patterns of the magnetic layer. The servo region 20 may include a gap section in addition to these regions or the regions may be arranged in a different order or manner. The data regions 30 have recording tracks 31 consisting of patterns of the magnetic layer and guard bands 32 consisting of grooves or a nonmagnetic portion, the recording tracks 31 and guard bands 32 being alternately formed along the radial direction. In such a microscopic range as shown in FIG. 2, the radial direction and the circumferential direction are depicted such that they are orthogonal to each other. However, the servo regions may be formed like arcs in the magnetic disk as a whole so as to correspond with the locus of the actuator arm of the head slider. Further, the patterns of the magnetic layer may vary depending on the radial position.

In the embodiment of the present invention, in a case where two magnetic patterns used as address bits on the servo regions corresponding to two adjacent recording tracks are arranged in such a manner that one corner of one of the magnetic patterns is closest to one corner of the other, the corners of the two magnetic patterns are substantially joined together.

Figure 3:
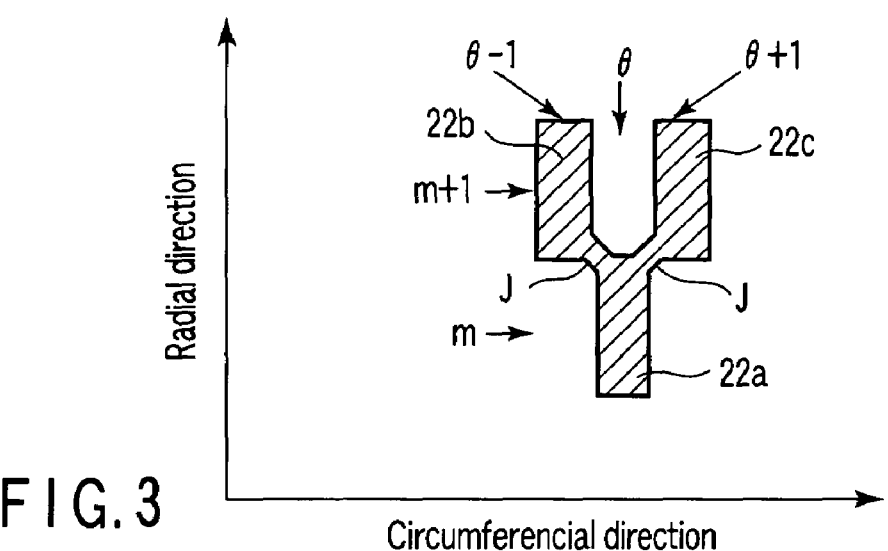
FIG. 3 is a plan view showing joined magnetic patterns used as address bits in the magnetic disk according to an embodiment of the present invention.

With reference to FIG. 3, a configuration of the magnetic patterns of the address section in the servo region 22 will be described. FIG. 3 shows a magnetic pattern 22a used as an address bit for a recording track m and magnetic patterns 22b and 22c used as address bits for the adjacent recording track m+1. The angular positions of 22a, 22b, and 22c are $\theta$, $\theta-1$, and $\theta+1$, respectively. One corner of the magnetic pattern 22a is arranged closest to one corner of the magnetic pattern 22b, and the corners of the magnetic patterns 22a and 22b are joined together by a junction J. Likewise, one corner of the magnetic pattern 22a is arranged closest to one corner of the magnetic pattern 22c, and the corners of the magnetic patterns 22a and 22c are joined together by a junction J.

By thus joining the corners of the two adjacent magnetic patterns, used as address bits, it is possible to suppress concentration of magnetic fluxes in the corners of the magnetic patterns. Consequently, noise is reduced to enable good address signals to be obtained.

The positional relationship between the magnetic patterns used as address bits as shown in FIG. 3 is generalized as follows. The positional relationship between the magnetic patterns 22a and 22b is such that a signal for the track m and angular position $\theta$ differs from a signal for the track m+1 and angular position $\theta$ and from a signal for the track m and angular position $\theta-1$ and that the signal for the track m and angular position $\theta$ is the same as a signal for the track m+1 and angular position $\theta-1$. The positional relationship between the magnetic patterns 22a and 22c is such that the signal for the track m and angular position $\theta$ differs from the signal for the track m+1 and angular position $\theta$ and from a signal for the track m and angular position $\theta+1$ and that the signal for the track m and angular position $\theta$ is the same as a signal for the track m+1 and angular position $\theta+1$. The two magnetic patterns having such a positional relationship have their corners arranged closest to each other. In this case, one corner of the magnetic pattern (22a) with the track m and angular position $\theta$ is substantially joined to one corner of the magnetic pattern (22b) with the track m+1 and angular position $\theta-1$ or the magnetic pattern (22c) with the track m+1 and angular position $\theta+1$.

The junction J preferably meets the following conditions. The circumferential length of the junction J is equal to or smaller than that of one of the joined magnetic patterns. The radial length of the junction J is equal to or smaller than a quarter of the track width of one of the joined magnetic patterns.

Figure 4:
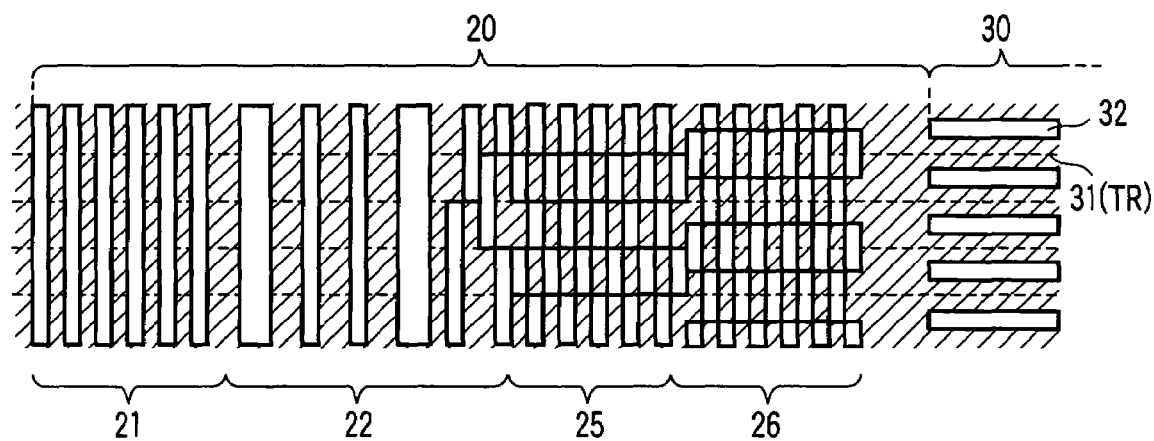
FIG. 4 is a plan view showing another example of magnetic patterns in a magnetic disk according to an embodiment of the present invention.

FIG. 4 shows another example of the magnetic patterns formed on the surface of the magnetic disk 71. In FIG. 2, a burst ABCD is provided as one section. In contrast, in FIG. 4, the burst section is divided into a first burst section (AB) 25 and a second burst section (CD) 26. In the first burst section 25 and the second burst section 26, shown in FIG. 4, adjacent magnetic patterns may be arranged so that one corner of one of the magnetic patterns is closest to one corner of the other, as in the case of the address section 22. Accordingly, a magnetic disk having such servo regions as shown in FIG. 4, corners of two magnetic patterns are preferably joined together as shown in FIG. 3, not only in the address section 22 but also in the first burst section 25 and the second burst section 26.

In order to join the corners of the magnetic patterns as shown in FIG. 3, imprinting is carried out using a stamper having patterns of projections and recesses corresponding to the magnetic patterns. The stamper has projection patterns in which portions corresponding to the junctions between the corners of the magnetic patterns in the magnetic recording media are separated from each other. Therefore, when such a stamper is used to transfer fine patterns to a resist by imprinting, channels through which a part of the resist to be removed can pass are established. This makes it possible to avoid pattern fall or pattern collapse. Correspondingly, it is possible to suppress pattern fall or pattern collapse in the stamper during imprinting. This improves the durability of the stamper to increase the number of magnetic disks that can be imprinted with one stamper.

Examples of the present invention will be described below.

EXAMPLE

In accordance with the processes shown in FIGS. 5A to 5F and 6A to 6F, a magnetic disk according to the present example was produced. The magnetic disk had a track density of 100 kTPI (Track Per Inch) in a data zone of a radius range between 5 mm and 10 mm. One track includes 120 sectors. One sector corresponds to 10,000 bits.

Figure 7:
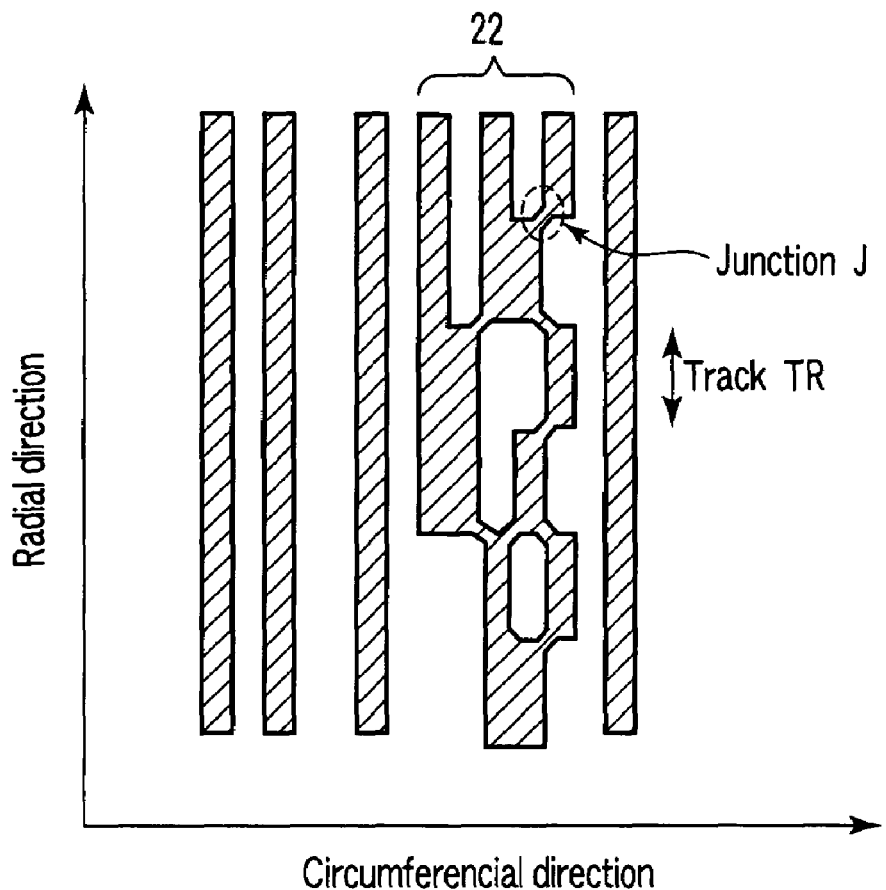
FIG. 7 is a plan view of joined magnetic patterns used as address bits in the magnetic disk according to an example of the present invention, in which the hatched portions show magnetic portions, while the white background shows a nonmagnetic portion.

FIG. 7 shows a part of the address section 22, which is a part of the servo region in one sector. This figure shows that, where two magnetic patterns used as address bits were arranged in such a manner that one corner of one of the magnetic patterns was closest to one corner of the other, the corners of the two magnetic patterns are joined together with the junction J. The size of the junction J was designed as described below. The circumferential length of the junction J was about half that of one of the joined magnetic patterns. The radial length of the junction J is one-tenth of the track width of one of the joined magnetic patterns.

Figure 8:
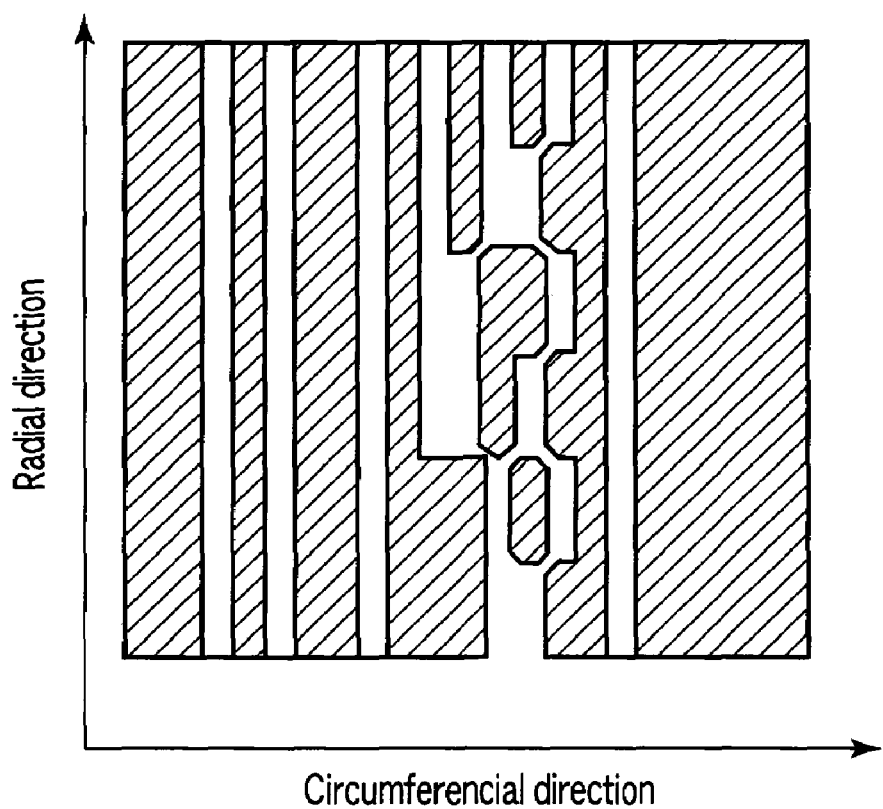
FIG. 8 is a plan view showing the projection patterns in a stamper used to manufacture the magnetic disk shown in FIG. 7, in which the hatched portions show the projection portions, while the white background shows recess portions.

To manufacture a magnetic disk having such servo regions, imprinting is carried out using a stamper having patterns of projections and recesses corresponding to the magnetic patterns on the magnetic disk, as shown in FIG. 8. In the patterns of projections and recesses of the magnetic layer formed by imprinting and subsequent processing, the recess portions may be filled with a nonmagnetic material so as to flatten the surface.

A method for manufacturing the magnetic disk in this Example will be described in detail.

First, a stamper was produced using the method shown in FIGS. 5A to 5F.

Figure 5A:
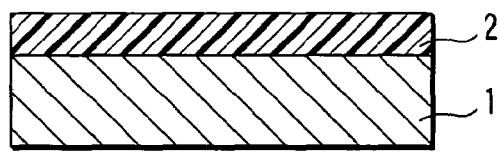
FIGS. 5A to 5F are sectional views showing a method of manufacturing a stamper used in an example of the present invention.

As shown in FIG. 5A, a 6-inch Si wafer 1 was prepared and was surface-treated with hexamethyl disilazane (HMDS). On the other hand, a resist ZEP-520 manufactured by ZEON Corporation was diluted twice with anisole, followed by filtering with a 0.2-μm membrane filter. The Si wafer 1 was spin-coated with the resist solution, which was then pre-baked at 200° C. for three minutes, thereby forming the resist 2 with a thickness of about 0.1 μm.

Figure 5D:
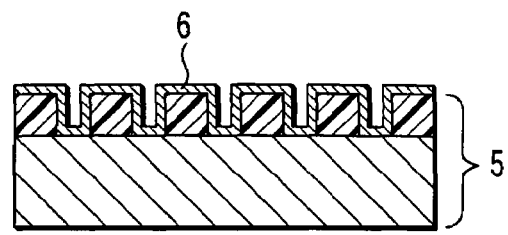
Figure 5B:
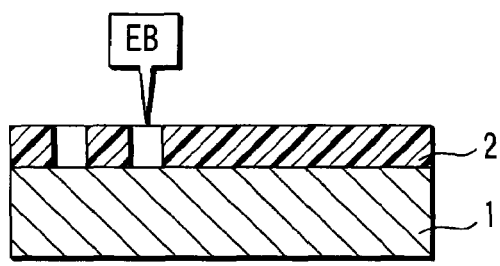

As shown in FIG. 5B, desired patterns were drawn directly on the resist 2 on the Si wafer 1 at an acceleration voltage of 50 kV using electron beam lithography equipment having a ZrO/W thermal field emission type electron gun emitter. In the drawing process, used was a signal source generating signals for forming servo patterns, burst patterns, address patterns, and track patterns, signals send to a stage driving system for the drawing equipment, and signals for controlling electron beam deflection in a synchronized manner. In this process, the drawing was carried out such that, in a site where two magnetic patterns used as address bits on the servo regions corresponding to two adjacent recording tracks are arranged in such a manner that one corner of one of the magnetic patterns is closest to one corner of the other, the corners of the two magnetic patterns are substantially joined together. During the drawing process, the stage was rotated at a constant linear velocity (CLV) of 500 mm/s and moved in the radial direction. The electron beam was deflected for each rotation to draw track regions into concentric circles.

Figure 5E:
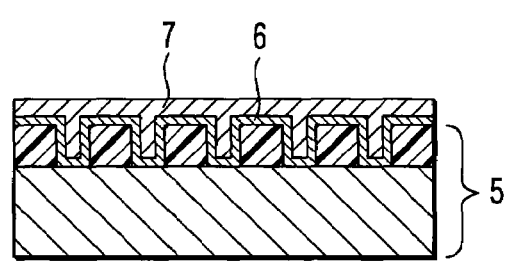
Figure 5C:
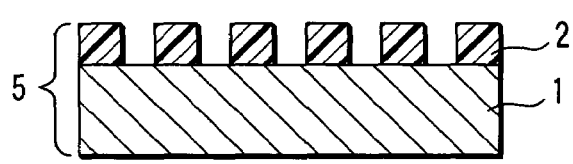

As shown in FIG. 5C, the Si wafer 1 was immersed in ZED-N50 (manufactured by ZEON Corporation) for 90 seconds to develop the resist 2. The wafer was then immersed and rinsed in ZMD-B (manufactured by ZEON Corporation) for 90 seconds. The wafer was then dried by air blow to produce a resist master 5.

As shown in FIG. 5D, a conductive film 6 consisting of Ni was deposited on the resist master 5 by sputtering. Specifically, pure nickel was used as a target and a chamber was evacuated to a vacuum of $8 \times 10^{-3}$ Pa. An argon gas was introduced into the chamber by which the pressure of the chamber was adjusted to 1 Pa. In the chamber, 400-W DC power was applied to carry out sputtering for 40 seconds, thereby depositing a conductive film 6 with a thickness of about 30 nm.

As shown in FIG. 5E, the resist master 5 with the conductive film 6 was immersed in a nickel sulfamate plating solution (NS-160 manufactured by Showa Chemical Industry Co., Ltd.). The resist master 5 was electroformed for 90 minutes to form a Ni electroformed film 7 with a thickness of about 300 μm. Conditions for the electroforming are as follows:

Nickel sulfamate: 600 g/L,
Boric acid: 40 g/L,
Surfactant (sodium lauryl sulfate): 0.15 g/L,
Liquid temperature: 55° C.,
pH: 4.0,
Current density: 20 A/dm$^2$.

Figure 5F:
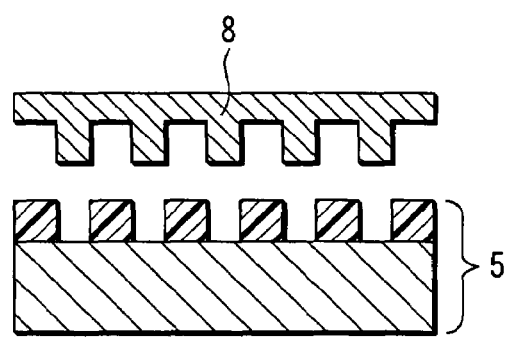

As shown in FIG. 5F, the electroformed film 7 and conductive film 6 were peeled off from the resist master 5 with a resist residue adhered thereon. The resist residue was removed by oxygen plasma ashing. Specifically, an oxygen gas was introduced into the chamber at 100 ml/min and the pressure in the chamber was adjusted to 4 Pa. Then, in the chamber, 100-W power was applied to carry out plasma ashing for 20 minutes. Thus, a father stamper including the conductive film 6 and electroformed film 7 was provided. Subsequently, the unnecessary portions of the farther stamper were punched off using a metal blade to obtain an imprint stamper 8. The stamper 8 had the patterns shown in FIG. 8.

Then, a magnetic disk was manufactured by the method shown in FIGS. 6A to 6F.

Figure 6A:
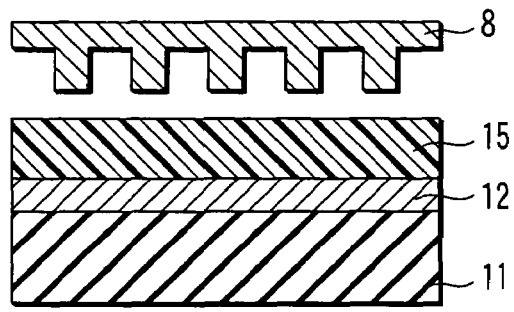
FIGS. 6A to 6F are sectional views showing a method of manufacturing a magnetic disk according to an example of the present invention.

As shown in FIG. 6A, the stamper 8 was subjected to ultrasonic cleaning with acetone for 15 minutes. The stamper 8 was treated as described below in order to improve releasability during imprinting. A solution of fluoroalkylsilane [CF$_3$(CF$_2$)$_7$CH$_2$CH$_2$Si(OMe)$_3$] (TSL8233 manufactured by GE Toshiba Silicones) diluted with ethanol to a concentration of 5% was prepared. The stamper 8 was immersed in the solution for 30 minutes, followed by blowing away a residual solution using a blower, and then the stamper 8 was annealed at 120° C. for one hour.

On the other hand, a magnetic recording layer 12 was deposited by sputtering on a disk substrate 11 having consisting of doughnut-shaped glass with a diameter of 0.85 inches. The magnetic recording layer 12 was spin-coated with a resist 15 (S1801 manufactured by Rohm and Haas) at a rotating speed of 4,000 rpm.

Figure 6B:
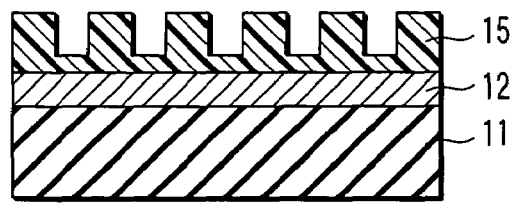

As shown in FIG. 6B, the stamper 8 was brought into contact with the resist 15 on the surface of the disk substrate 11 and pressed at 1,800 bar for one minute to transfer the patterns of the stamper 8 to the resist 15. The resist 15 to which the patterns had been transferred was irradiated with UV for five minutes, and then baked at 160° C. for 30 minutes. With the process for forming projections and recesses by imprinting, resist residues remain at the bottom of each of the recesses.

Figure 6C:
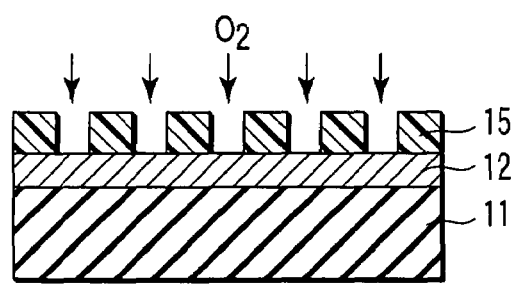
Figure 6D:
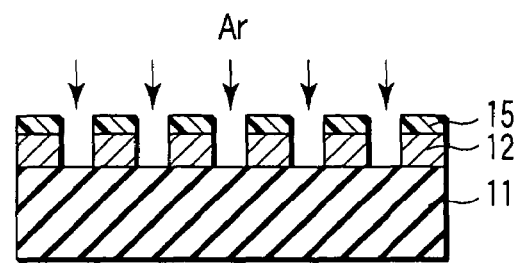
Figure 6E:
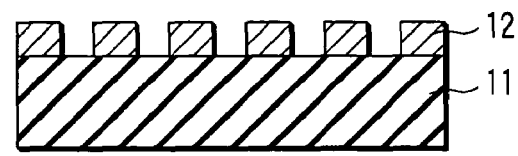
Figure 6F:
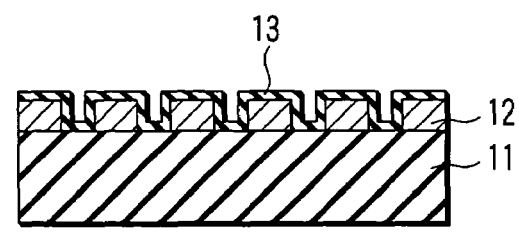

As shown in FIG. 6C, the resist residue at the bottom of each of the recesses was removed by reactive ion etching (RIE) with an oxygen gas. As shown in FIG. 6D, the magnetic recording layer 12 was etched by Ar ion milling using the patterns of the resist 15 as a mask. As shown in FIG. 6E, the patterns of the resist 15 was stripped away by oxygen RIE. As shown in FIG. 6F, a carbon protective layer 13 was deposited all over the surface of the magnetic recording layer 12. Subsequently, a lubricant was applied to the magnetic disk produced. The recesses in the stamper 8, shown in FIG. 6A, correspond to the projected magnetic portions on the media shown in 6F.

One thousand magnetic disks were manufactured by the method including the imprinting process using one stamper. Magnetic recording apparatuses were assembled using magnetic disks produced every appropriate number of imprinting processes. The magnetic recording apparatuses were tested for performance by detecting address signals. As a result, for all the magnetic disks including the one produced in 1,000th imprinting process, desired address signals were obtained within the range between the inner peripheral position and the outer peripheral position.

COMPARATIVE EXAMPLE

In the Comparative Example, conditions for electron beam lithography were varied from those in the method for manufacturing a stamper in the above Example. That is, in the electron beam lithography, in a case where two projection patterns in a section corresponding to the address section on the servo region are arranged in such a manner that one corner of one of the projection patterns is closest to one corner of the other, electron beam spots for drawing these two projection patterns were applied so as not to overlap with each other. In the other respects, the processes similar to those used in the above Example were used to produce a stamper and then to manufacture a magnetic disk using the resultant stamper.

Figure 9:
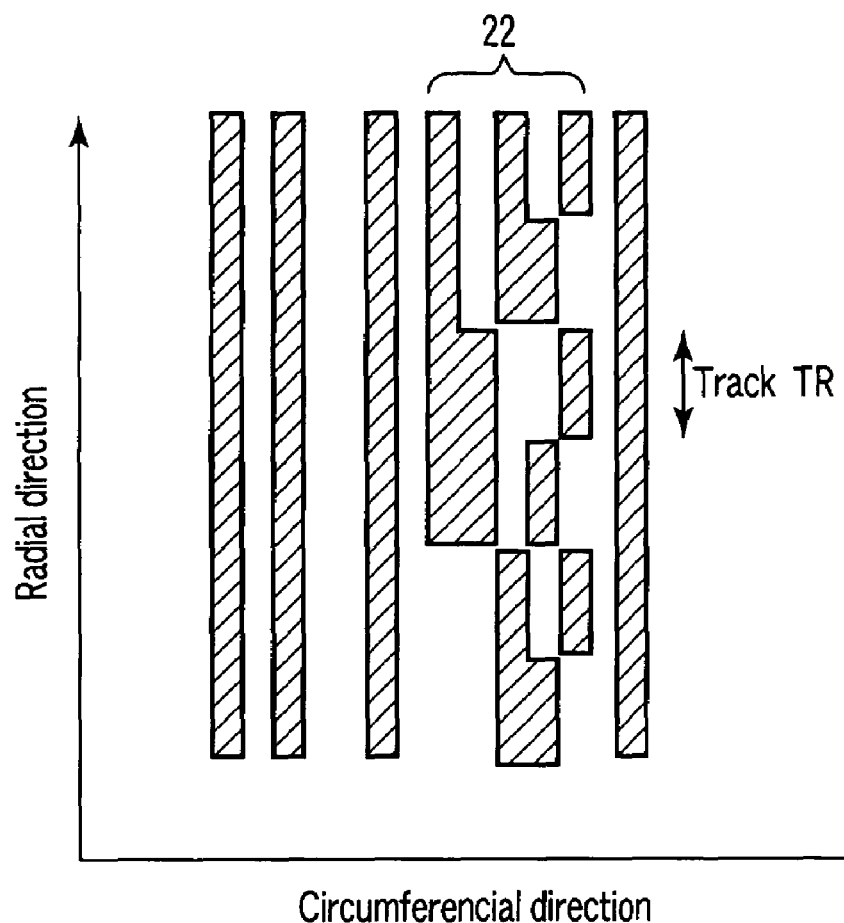
FIG. 9 is a plan view showing magnetic patterns used as address bits in a magnetic disk according to a comparative example.
Figure 10:
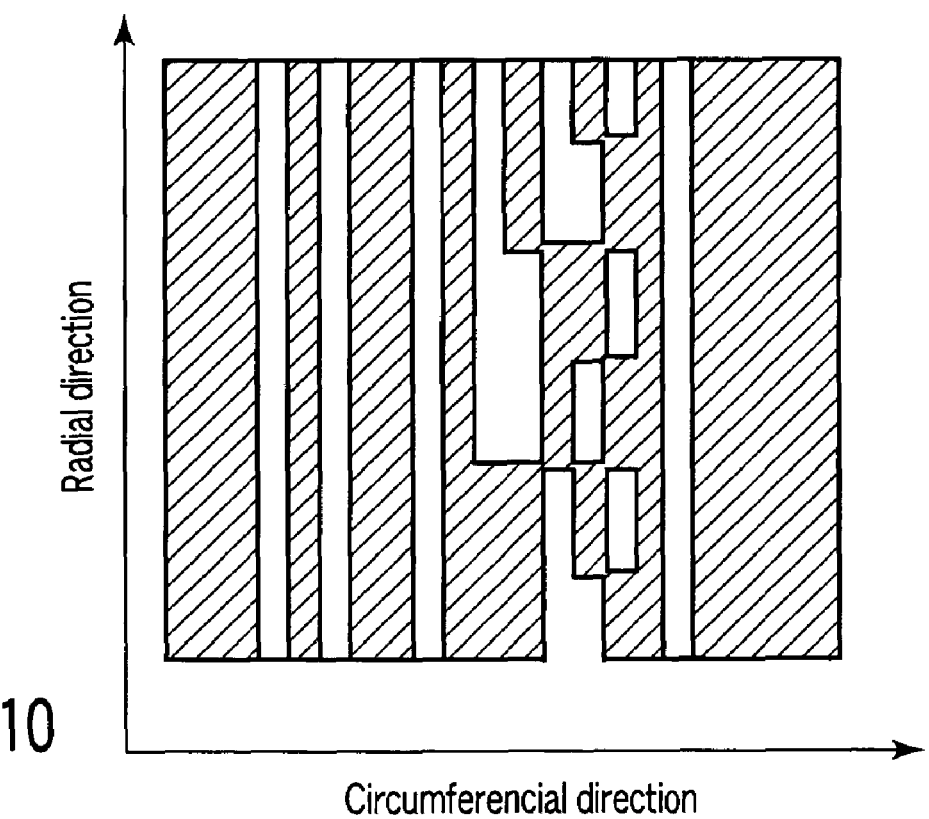
FIG. 10 is a plan view showing projection patterns in a stamper used to manufacture the magnetic disk shown in FIG. 9.

FIG. 10 shows the projection patterns of the stamper used in the Comparative Example. As shown in this figure, the two adjacent projection patterns of the stamper are formed such that their corners are almost in point-contact with each other. FIG. 9 shows the magnetic patterns of a magnetic disk according to the Comparative Example manufactured using the stamper. As shown in this figure, the two adjacent magnetic patterns of the magnetic disk are formed such that their corners are almost in point-contact with each other.

One thousand magnetic disks were manufactured by the method including the imprinting process using one stamper, as in the case of the Example. Magnetic recording apparatuses were assembled using magnetic disks produced every appropriate number of imprinting processes. The magnetic recording apparatuses were tested for performance by detecting address signals.

As a result, in the 500th magnetic disk, an address signal error was detected particularly on an outer peripheral portion. The stamper after the use for processing the 500th magnetic disk was examined with an atomic force microscope (AFM). Then, no defect was observed in the projection patterns corresponding to the address section. Further, in the 1,000th magnetic disk, address signal errors occurred all over the disk from an inner peripheral position to an outer peripheral position. The stamper after the use for processing the 1,000th magnetic disk was examined with AFM. Then, defects were observed in the projection patterns corresponding to the address section.

Now, materials used for the layers of the magnetic recording media according to the embodiments of the present invention as well as the stacked structure of the layers will be described.

<Substrate>

The substrate may be, for example, a glass substrate, an Al-based alloy substrate, a ceramic substrate, a carbon substrate, a compound semiconductor substrate, or an Si single-crystal substrate. The glass substrate may be formed of amorphous glass or crystallized glass. The amorphous glass includes soda lime glass, aluminocilicate glass, or the like. The crystallized glass includes lithium-based crystallized glass or the like. The ceramic substrate includes a sintered body mainly formed of aluminum oxide, aluminum nitride, silicon nitride, or the like, or a material obtained by fiber-reinforcing the sintered body. The compound semiconductor substrate includes GaAs, AlGaAs, or the like. The Si single-crystal substrate, so-called a silicon wafer, may have an oxide film on the surface thereof.

<Soft-Magnetic Underlayer>

When a perpendicular magnetic recording media is produced, so-called perpendicular double layer media in which a perpendicular magnetic recording layer is formed on a soft-magnetic underlayer (SUL) is used. The soft-magnetic underlayer in the perpendicular double layer media is provided so as to pass a recording magnetic field from a recording magnetic pole through this layer and to return the recording magnetic field to a return yoke arranged near the recording magnetic pole. That is, the soft-magnetic underlayer provides a part of the function of the write head, serving to apply a steep perpendicular magnetic field to the recording layer so as to improve recording efficiency.

The soft-magnetic underlayer is formed of a high permeability material containing at least one of Fe, Ni, and Co. Such materials include, an FeCo-based alloy such as FeCo and FeCoV, an FeNi-based alloy such as FeNi, FeNiMo, FeNiCr and FeNiSi, an FeAl- and FeSi-based alloy such as FeAl, FeAlSi, FeAlSiCr, FeAlSiTiRu and FeAlO, an FeTa-based alloy such as FeTa, FeTaC and FeTaN, and an FeZr-based alloy such as FeZrN.

The soft-magnetic underlayer may be formed of a material having a microcrystalline structure or a granular structure containing fine grains dispersed in a matrix such as FeAlO, FeMgO, FeTaN, and FeZrN, each containing 60 at % or more of Fe.

The soft-magnetic underlayer may be formed of other materials such as a Co alloy containing Co and at least one of Zr, Hf, Nb, Ta, Ti and Y. The material preferably contains 80 at % or more of Co. An amorphous layer is easily formed when such a Co alloy is deposited by sputtering. The amorphous soft-magnetic material exhibits very excellent soft magnetism because of free of magnetocrystalline anisotropy, crystal defects and grain boundaries. Further, the use of the amorphous soft-magnetic material reduces noise from the media. Preferred amorphous soft-magnetic materials include, for example, a CoZr-, CoZrNb- and CoZrTa-based alloys.

Another underlayer may be provided under the soft-magnetic underlayer in order to improve the crystalinity of the soft-magnetic underlayer or the adhesion to the substrate. Materials for the underlayer include Ti, Ta, W, Cr, Pt, and an alloy thereof, and oxide and nitride containing the above metal.

An intermediate layer consisting of a nonmagnetic substance may be provided between the soft-magnetic underlayer and the perpendicular magnetic recording layer. The intermediate layer serves to disrupt exchange coupling interaction between the soft-magnetic underlayer and the recording layer and to control the crystalinity of the recording layer. Materials for the intermediate layer include Ru, Pt, Pd, W, Ti, Ta, Cr, Si and an alloy thereof, and oxide and nitride containing the above metal.

To prevent spike noise, the soft-magnetic underlayer may be divided into layers that are antiferromagnetically coupled with each other through a Ru layer with a thickness of 0.5 to 1.5 nm sandwiched therebetween. Alternatively, the soft-magnetic layer may be exchange-coupled with a pinning layer formed of a hard magnetic material with in-plane anisotropy, such as CoCrPt, SmCo and FePt, or an antiferromagnetic material such as IrMn and PtMn. In this case, to control the exchange coupling force, a magnetic layer such as Co or a nonmagnetic layer such as Pt may be stacked on the Ru layer.

<Perpendicular Magnetic Recording Layer>The perpendicular magnetic recording layer is formed of, for example, a material mainly containing Co, containing at least Pt, containing Cr as required, and further containing an oxide (such as silicon oxide and titanium oxide). In the perpendicular magnetic recording layer, magnetic crystal grains preferably form a columnar structure. In a perpendicular magnetic recording layer having such a structure, the magnetic crystal grains have favorable orientation and crystality, making it possible to provide a signal-to-noise ratio (SNR) suitable for high-density recording. The amount of oxide is important for obtaining the above structure. The content of the oxide in the total amount of Co, Pt and Cr is preferably 3 mol % or more and 12 mol % or less, more preferably 5 mol % or more and 10 mol % or less. If the content of the oxide in the perpendicular magnetic recording layer is within this range, the oxide is precipitated around the magnetic grains, making it possible to isolate the magnetic grains and to reduce their sizes. If the content of the oxide exceeds the above range, the oxide remains in the magnetic grains to degrade the orientation and crystalinity. Moreover, the oxide is precipitated over and under the magnetic grains to prevent formation of the columnar structure in which the magnetic grains penetrate the perpendicular magnetic recording layer in the perpendicular direction. On the other hand, if the content of the oxide is less than the above range, the isolation of the magnetic grains and the reduction in their sizes are insufficient. This increases noise in reading data, making it impossible to obtain a signal-to-noise ratio (SNR) suitable for high-density recording.

The content of Pt in the perpendicular magnetic recording layer is preferably 10 at % or more and 25 at % or less. When the Pt content is within this range, the perpendicular magnetic recording layer provides a required uniaxial magnetic anisotropy constant Ku. Moreover, the magnetic grains exhibit good cyrstalinity and orientation, resulting in thermal fluctuation characteristics and read/write characteristics suitable for high-density recording. If the Pt content exceeds the above range, a layer of an fcc structure may be formed in the magnetic grains to degrade the crystalinity and orientation. On the other hand, if the Pt content is less than the above range, it is impossible to obtain a uniaxial magnetic anisotropy constant Ku and thus thermal fluctuation characteristics suitable for high-density recording.

The content of Cr in the perpendicular magnetic recording layer is preferably 0 at % or more and 16 at % or less, more preferably 10 at % or more and 14 at % or less. When the Cr content is within this range, high magnetization can be maintained without reduction in uniaxial magnetic anisotropy constant Ku. This brings sufficient read/write characteristics and thermal fluctuation characteristics suitable for high-density recording. If the Cr content exceeds the above range, the constant Ku of the magnetic grains decreases to degrade the thermal fluctuation characteristics and the crystalinity and orientation of the magnetic grains. As a result, the read/write characteristics may be degraded.

The perpendicular magnetic recording layer may contain not only Co, Pt, Cr and an oxide but also one or more additive elements selected from the group consisting of B, Ta, Mo, Cu, Nd, W, Nb, Sm, Tb, Ru and Re. These additive elements enable to facilitate reduction in the sizes of the magnetic grains or to improve the crystalinity and orientation. This in turn makes it possible to provide read/write characteristics and thermal fluctuation characteristics more suitable for high-density recording. The total content of these additive elements is preferably 8 at % or less. If the total content exceeds 8 at %, a phase other than a hcp phase is formed in the magnetic grains. This disturbs crystalinity and orientation of the magnetic grains, making it impossible to provide read/write characteristics and thermal fluctuation characteristics suitable for high-density recording.

Other materials for the perpendicular magnetic recording layer include a CoPt-based alloy, a CoCr-based alloy, a CoPtCr-based alloy, CoPtO, CoPtCrO, CoPtSi and CoPtCrSi. The perpendicular magnetic recording layer may be formed of a multilayer film containing a film of an alloy mainly including an element selected from the group consisting of Pt, Pd, Rh and Ru and a Co layer. The perpendicular magnetic recording layer may be formed of a multilayer film such as CoCr/PtCr, CoB/PdB and CoO/RhO, which are prepared by adding Cr, B or O to each layer of the above multilayer film.

The thickness of the perpendicular magnetic recording layer preferably ranges between 5 nm and 60 nm, more preferably between 10 nm and 40 nm. A perpendicular magnetic recording layer having a thickness within this range is suitable for high-density recording. If the thickness of the perpendicular magnetic recording layer is less than 5 nm, read output tends to be so low that a noise component becomes relatively high. On the other hand, when the thickness of the perpendicular magnetic recording layer exceeds 40 nm, read output tends to be so high as to distort waveforms. The coercivity of the perpendicular magnetic recording layer is preferably 237,000 A/m (3,000 Oe) or more. If the coercivity is less than 237,000 A/m (3,000 Oe), the thermal fluctuation characteristics may be degraded. The perpendicular squareness of the perpendicular magnetic recording layer is preferably 0.8 or more. If the perpendicular squareness is less than 0.8, the thermal fluctuation resistance tends to be degraded.

<Protective Layer>

The protective layer serves to prevent corrosion of the perpendicular magnetic recording layer and to prevent damage to the media surface when the magnetic head comes into contact with the media. Materials for the protective layer include, for example, C, $SiO_2$ and $ZrO_2$. The protective layer preferably has a thickness of 1 to 10 nm. When the thickness of the protective layer is within this range, the distance between the head and the media can be reduced. This is suitable for high-density recording.

<Lubricant Layer>

The lubricant may be formed of, for example, perfluoropolyether, fluorinated alcohol or fluorinated carboxylic acid.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording media having a magnetic layer formed on a substrate, comprising:
    data regions including a magnetic pattern constituting a recoding track; and
    servo regions including magnetic patterns used as address bits,
    the data regions and the servo regions being contained in a plane of the magnetic layer,
    wherein, in a case where two magnetic patterns used as address bits on the servo regions corresponding to two adjacent recording tracks are arranged in such a manner that one corner of one of the magnetic patterns is closest to one corner of the other, the corners of the two magnetic patterns are substantially joined together so as to form a junction to suppress the concentration of magnetic fluxes in the corners of the magnetic patterns, and wherein a length of the junction in a circumferential direction is equal to or smaller than that of one of the joined magnetic patterns.

2. The magnetic recording media according to claim 1, wherein the magnetic patterns are separated from each other by a nonmagnetic portion.

3. The magnetic recording media according to claim 1, wherein the magnetic patterns are separated from each other by a groove.

4. The magnetic recording media according to claim 1, wherein the servo regions include a preamble section, an address section, and a burst section.

5. The magnetic recording media according to claim 1, wherein a length of the junction in a radial direction is equal to or smaller than a quarter of the track width of one of the joined magnetic patterns.

6. The magnetic recording media according to claim 1, wherein the magnetic patterns include a soft magnetic underlayer and a perpendicular magnetic recording layer formed on the soft magnetic underlayer.

7. The magnetic recording media according to claim 6, further comprising a protective layer on the perpendicular magnetic recording layer.

8. A stamper used to manufacture the magnetic recording media according to claim 1 comprising patterns of projections and recesses corresponding to the magnetic patterns of the magnetic recording media.

9. The stamper according to claim 8, wherein the stamper has projection patterns in which portions corresponding to the junctions between the corners of the magnetic patterns in the magnetic recording media are separated from each other.

10. The stamper according to claim 8, wherein the stamper is formed of nickel.

\* \* \* \* \*